(12) United States Patent
Ananthanarayanan et al.

(10) Patent No.: US 7,945,525 B2
(45) Date of Patent: May 17, 2011

(54) METHODS FOR OBTAINING IMPROVED TEXT SIMILARITY MEASURES WHICH REPLACE SIMILAR CHARACTERS WITH A STRING PATTERN REPRESENTATION BY USING A SEMANTIC DATA TREE

(75) Inventors: Rema Ananthanarayanan, New Delhi (IN); Sreeram V. Balakrishnan, Los Altos, CA (US); Yuen Y. Lo, Cambridge, MA (US); Berthold Reinwald, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 11/937,550

(22) Filed: Nov. 9, 2007

(65) Prior Publication Data
US 2009/0125805 A1 May 14, 2009

(51) Int. Cl.
*G06F 17/00* (2006.01)
(52) U.S. Cl. ........................................................ 706/45
(58) Field of Classification Search .............. 706/45–48, 706/62; 707/736–747
See application file for complete search history.

(56) References Cited

U.S. PATENT DOCUMENTS

| | | | | |
|---|---|---|---|---|
| 6,278,992 | B1* | 8/2001 | Curtis et al. | 707/711 |
| 7,461,047 | B2* | 12/2008 | Masuichi et al. | 706/62 |
| 2003/0191627 | A1* | 10/2003 | Au | 704/9 |
| 2004/0117395 | A1* | 6/2004 | Gong et al. | 707/101 |
| 2005/0060332 | A1* | 3/2005 | Bernstein et al. | 707/100 |
| 2005/0251383 | A1* | 11/2005 | Murray | 704/9 |
| 2006/0253427 | A1* | 11/2006 | Wu et al. | 707/3 |
| 2009/0055378 | A1* | 2/2009 | Alecu et al. | 707/5 |

* cited by examiner

*Primary Examiner* — David R Vincent
(74) *Attorney, Agent, or Firm* — Gibb I.P. Law Firm, LLC; Derek S. Jennings (57) ABSTRACT

The embodiments of the invention provide methods for obtaining improved text similarity measures. More specifically, a method of measuring similarity between at least two electronic documents begins by identifying similar terms between the electronic documents. This includes basing similarity between the similar terms on patterns, wherein the patterns can include word patterns, letter patterns, numeric patterns, and/or alphanumeric patterns. The identifying of the similar terms also includes identifying multiple pattern types between the electronic documents. Moreover, the basing of the similarity on patterns identifies terms within the electronic documents that are within a category of a hierarchy. Specifically, the identifying of the terms reviews a hierarchical data tree, wherein nodes of the tree represent terms within the electronic documents. Lower nodes of the tree have specific terms; and, wherein higher nodes of the tree have general terms.

12 Claims, 8 Drawing Sheets

| Data Set 1 | Data Set 2 |
|---|---|
| 22P7753 - Data Migration Basic Kit | $89 FDD closing tool |
| 22P7769 - Data Migration PCI Kit | $99 Dollar closing tool |
| 22P7770 - Data Migration PCMCIA Kit | $99 DVD-RAM CD-RW Multi-burner drive with select thinkcenter purchase |
| 250 MM KVM Conversion cable | high capacity Li-Ion battery |
| 25M Fibre channel cable | X365 - 88625 RX |
|  | 1.6 GHZ, 1 GB memory, 60 GB HDD, dual matrox card, W2K |

| Original Text | Transformed Text |
|---|---|
| 00Z0300, 00Z0309, 00Z0310, 00Z0552, 00Z0591, 00Z0603 A20 CTO Model 1 year Warranty M82 Series | 00Z0[0-9][0-9][0-9] A[285]0 CTO Model 3 year warranty M(8[12]-5[01]) Series |

|  | Cellphone Reviews (1) | | Digital camera Reviews (2) | | Laptop Reviews (3) | | MP3 players Reviews (8) | | Printer Reviews (5) | |
|---|---|---|---|---|---|---|---|---|---|---|
|  | Before | After | Before | After | Before | After | Before | After | Before | After |
| (1) | 1 | 1 | 0.878 | 0.921 | 0.755 | 0.871 | 0.86 | 0.918 | 0.828 | 0.881 |
| (2) |  |  | 1 | 1 | 0.711 | 0.828 | 0.838 | 0.898 | 0.888 | 0.893 |
| (3) |  |  |  |  | 1 | 1 | 0.707 | 0.882 | 0.675 | 0.8 |
| (8) |  |  |  |  |  |  | 1 | 1 | 0.820 | 0.88 |
| (5) |  |  |  |  |  |  |  |  | 1 | 1 |

** METHODS FOR OBTAINING IMPROVED TEXT SIMILARITY MEASURES WHICH REPLACE SIMILAR CHARACTERS WITH A STRING PATTERN REPRESENTATION BY USING A SEMANTIC DATA TREE

BACKGROUND

1. Field of the Invention

The embodiments of the invention provide methods for obtaining improved text similarity measures.

2. Description of the Related Art

In data integration, data from multiple heterogeneous sources is combined and a unified view is presented to the end-user, for querying. The end user may be querying the unified view for example to gain business insights. Discovering a unified view includes identifying overlapping data sets. This is true for structured and unstructured data.

For unstructured data, the similarity between documents is computed by comparing the terms that occur in the documents. Various techniques such as probabilistic models, support vector machines, cosine similarity measures, and Kullback-Leibler (KL) divergence measures have been proposed for computing the similarity measures.

These techniques have also been extended to assess similarity between document sets. Many of these techniques involve the representation of each document or document set as a set of terms, where each term is a pair; the first element in the pair represents a token in the document, and the second element represents the frequency of occurrence of the token in the document. The token in itself could be represented at multiple levels of granularity, such as unigram token, bigram token, or a trigram token.

SUMMARY

The embodiments of the invention provide methods for obtaining improved text similarity measures. More specifically, a method of measuring similarity between at least two electronic documents begins by identifying similar terms between the electronic documents. This includes basing similarity between the similar terms on patterns, wherein the patterns can include word patterns, letter patterns, numeric patterns, and/or alphanumeric patterns. The identifying of similar terms also includes identifying multiple pattern types between the electronic documents. Moreover, basing of the similarity on patterns identifies terms within the electronic documents that are within a category of a hierarchy. Specifically, identifying the terms reviews a hierarchical data tree, wherein nodes of the tree represent terms within the electronic documents. Lower nodes of the tree are assigned to specific terms; and higher nodes of the tree are assigned to general terms.

The method replaces all the various similar terms with a single equivalent term multiple times to create transformed electronic documents. This can include replacing similar terms with a generic term (e.g., a domain name describing a category). The method can also maintain an index of the similar and equivalent terms. Replacing the similar terms can also include replacing a term represented by a node within a hierarchical tree with a different term represented by a higher node within the tree.

Subsequently, a similarity comparison is performed on the transformed electronic documents. This involves identifying (and/or constructing) transformed electronic documents having the substituted equivalent terms. Subsequently, a unified view is output to the user. The unified view includes the transformed electronic documents having the equivalent terms.

Accordingly, embodiments of the invention provide a definition of similarity across data sets, based on hierarchical levels of semantics for different words in the text. The hierarchical levels may be discovered based on some preprocessing techniques. A method is also provided for transforming the source document into a related document where the more general (generic) terms replace the specific terms across the different documents, based on the hierarchy defined previously. Further, a method is provided for improving the similarity assessment of text documents by performing the assessment on the transformed documents.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention provide a definition of similarity across data sets, based on hierarchical levels of semantics for different words in the text. The hierarchical levels may be discovered based on some preprocessing techniques. A method is provided for transforming the source document into a related document where the more general terms replace the specific terms across the different documents, based on the hierarchy defined previously. Further, a method is provided for improving the similarity assessment of text documents by performing the assessment on the transformed documents.

To account for syntactic variations between words, techniques such as stemming are used herein, where each word is replaced by the root form of the word, before computing the similarity. Other techniques herein function on word-to-word similarity in the various documents.

The embodiments herein account for words that have similar patterns, and are used to refer to the same kind of entity or concept. One example is phone numbers or pin (zip) codes of different locations. Another example is differentiated brand names of a product. For example, terms such as T-40 and T-60 could refer to different models of the same product made. Depending on the context, where detailed product differentiation is not needed, these could all be referenced by the generic term for the product or by the pattern T-XX.

These should be treated similarly based on the context, but current techniques cannot accomplish this. With embodiments herein, data sets containing such information are compared based on the patterns.

Furthermore, the embodiments herein account for words that are specific instances of the same generic entity, and that could be treated as referring to the same entity or concept, based on context. There are different sets of examples for words in this category. In most of the examples of this category, the words could fit into a hierarchy, with the most generic instance being at the root of the tree, and the more specific instances occurring in the child nodes, with a leaf node representing one specific instance. One example includes names of entities, such as person names, place names, etc. These could also fit into hierarchies such as name, person name, male name, Asian male name, etc. Another example includes words that refer to the same category of item. For instance, the similar terms, car, van, truck, etc., could all be replaced by the single equivalent term motor-vehicle or automobile. Differently named database applications could be replaced by the term database, or more generically, by the single equivalent term software. Different names of notebook or laptop computers could be replaced by the more general term 'mobile computer'. Current similarity computations do not take into account similarity between words and, therefore, such current similarity computations give an inaccurate picture of the level of similarity between the data sets.

The embodiments of the invention provide enhancements that identify patterns in the text that are similar to each other, or identify semantically related words based on a dictionary, thesaurus or domain-specific ontology. These occurrences are replaced by the common pattern, a more generic word, or equivalent word, in a transformed text, and the similarity comparisons are performed on the transformed text.

Figure 1:
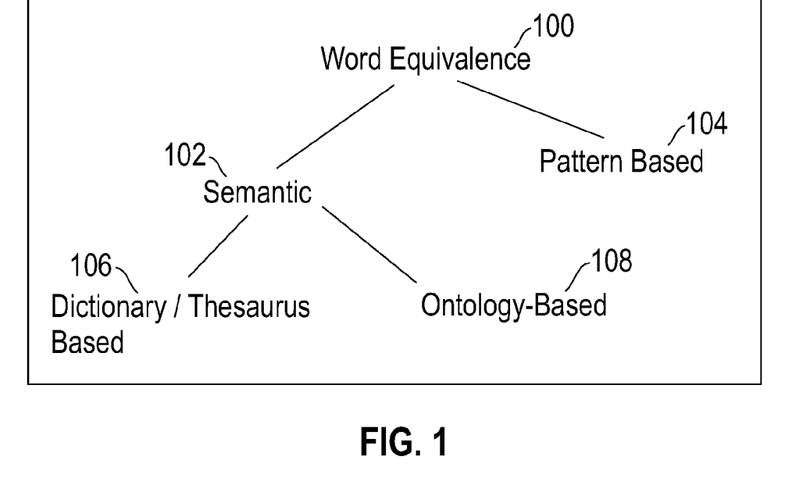
FIG. 1 is a diagram illustrating a hierarchy of semantics for similarity assessment of data sets.

First, similarity across data sets is defined based on hierarchical levels of semantics for different words in the text. FIG. 1 illustrates a hierarchy for similarity assessment of data sets and describes the various levels within which similarity is assessed. Thus, in FIG. 1, word equivalence 100 has two nodes or branches, semantic 102 and pattern-based 104. The semantic node or branch 102 has two sub-nodes or sub-branches; dictionary/thesaurus based 106; and ontology based 108. Any pair of words that come under a child-node of one of the nodes in FIG. 1 may be treated as equivalent and could be replaced by each other or a third word that is more generic, in the source text.

Additionally, schemes are provided herein for transforming a given source document into another semantically similar document where different words that have the same sense, in the given context, are replaced by the same equivalent word or words. Similar patterns are replaced by a common pattern representation. For instance, different sources that refer to individual models of a device as, T-40, T-42, T-60 and so on. These individual patterns could be collectively represented by a pattern such as T-[XX], which is a pattern of the character T followed by 2 digits. More specifically, the common pattern may be replaced by a string such as T-[d1,d2] (T-[d1][d2]) where d1 and d2 represent the possible values for the individual digits. Subsequently, a transformed document is created, where the initial terms such as T-40 and T-30 are replaced by the new pattern T-[XX]. The transformed document is then used for similarity computation with a gain in accuracy, in terms of capturing the similarity across the various documents in the document set.

While the above is one example for the transformation, it should be apparent to a person skilled in the art that such transformation can be achieved in various other alternate ways, and should fall within the scope of the present invention. Specifically, an ontology 108 may be used to replace all specific instances of objects or items with their more generic instance. For instance, the similar terms "car" and "van" can be replaced with the equivalent term "motor-vehicle". Named-entity annotators may be used to discover entities such as person name, place name, and so on, and replace these specific terms with a single generic term. Moreover, domain-specific taxonomies may be used to replace similar products with the more general term in that domain. Regular expression discovery tools may be used to discover regular expression patterns, as more fully described below. These may then be used to replace the actual pattern. For example, the regular expression T-[4|6][0] may be used wherever the pattern T-40 or T-60 occurs.

By applying these techniques to transform the data set, and performing similarity computations on the transformed data sets, more discriminating similarity results are obtained. The techniques herein are useful in instances where related data sets are identified, overcoming the limitations of current techniques that relate the data sets only on word overlap.

The definition of similarity based on hierarchical levels of semantics is shown in FIG. 1. The embodiments herein describe below two specific transformations. A first transformation provides recognition of alphanumeric strings in documents and replacement of such strings with their equivalent regular expression patterns (Transformation 1). A second transformation can identify conceptually related words in a specific domain taxonomy, and replace the more specific words with the more general words (Transformation 2).

Figure 2:
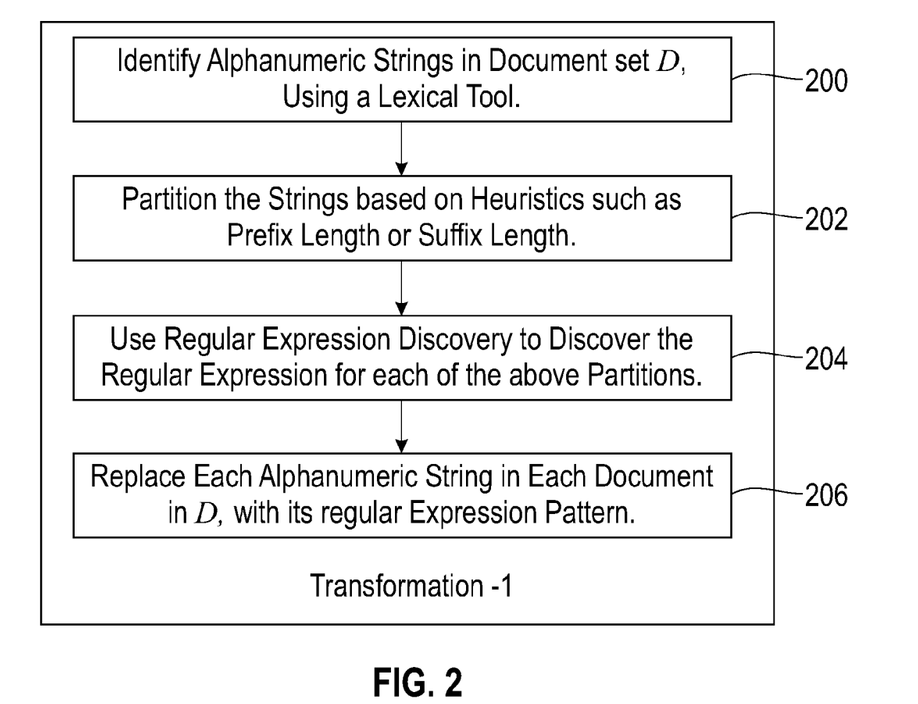
FIG. 2 is a diagram illustrating steps for replacement of alphanumeric strings with their equivalent patterns.

FIG. 2 illustrates steps for replacement of alphanumeric strings with their equivalent patterns (for the case of regular expression discovery). In regards to Transformation 1, the following are the steps for the transformation of a data set that occurs by discovering regular expression patterns of interest in data set, and replacing each occurrence with the equivalent pattern.

First, alpha-numeric strings are identified in item 200. Numeric and alpha-numeric strings in a data set D are identified using any string processing tool or routine. Let this set be called "W". Some lexical tools may also perform this step as part of lexical parsing. Second, the strings are partitioned into similar groups in item 202. These strings are clustered based on different clustering schemes, to group them into related sets of words. The clustering scheme may group numeric strings separately. Some clustering schemes for both numeric and alpha-numeric strings could be based on the maximum common prefix length or the maximum common suffix length. At the end of this step, the set of words W is partitioned into n subsets, $W_1, W_2, \ldots, W_n$.

Next, in item 204 word patterns are discovered for each of the above groups. The regular expression discovery method is then run on each of these n sets of words and regular expressions (equivalent terms) are discovered for each set of words. Following this, in item 206 the word is replaced by the discovered word pattern. Thus, each of the words in the set W is replaced by its equivalent discovered regular expression in the document set D. Let the transformed document set be referred to as "D'". Subsequently, the transformed document is used for subsequent computations. The transformed data set D' is used for subsequent similarity assessments.

Figure 3:
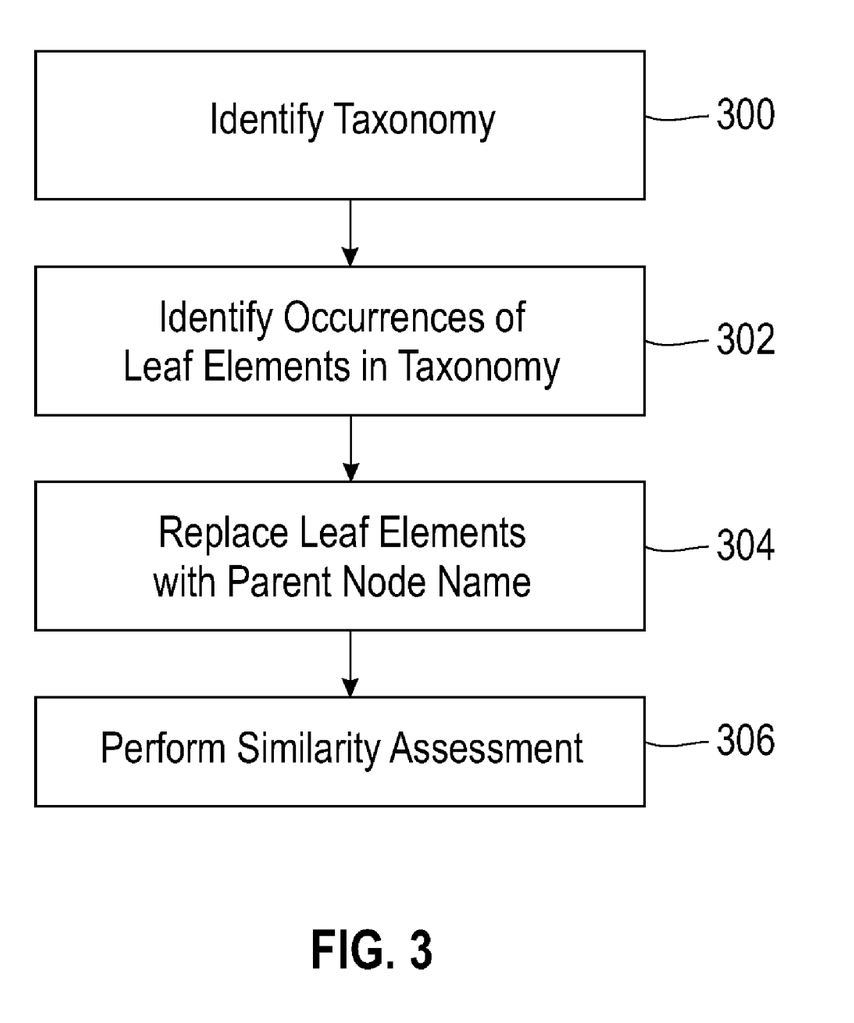
FIG. 3 is a diagram illustrating snippets of data that show promise for more concise signatures after pattern discovery and replacement

With regards to Transformation 2, as shown in FIG. 3, following are the steps for replacing more specific words in a domain taxonomy with more general words. First, the taxonomy is identified for the domain of interest in item 300. In some cases, this may be readily available—for instance, product catalogs etc. In some cases it may need to be constructed. Next, for each document in the data set, the method identifies occurrences of the leaf elements in the taxonomy in the text data sets item 302, and replaces these with the name of the parent node 304. In some cases, it may be relevant to replace them with the name of a node at a higher level than the parent node. Subsequently, the method performs the similarity assessments on the transformed data sets 306.

The cosine similarity, which is a well-known similarity measure in text processing, may be used. However, it should be apparent to a person skilled in the art that any relevant measure of similarity may be used. The similarity between data sets can be computed as follows. First, based on the data sets, the embodiments herein identify the most relevant transformations, and more than one of these could be applied to compute similarity between the data sets. Next, the embodiments herein perform the transformations as described in the paragraphs above. Subsequently, the embodiments herein compute the similarity between the transformed data sets rather than the initial data sets.

Figure 4:
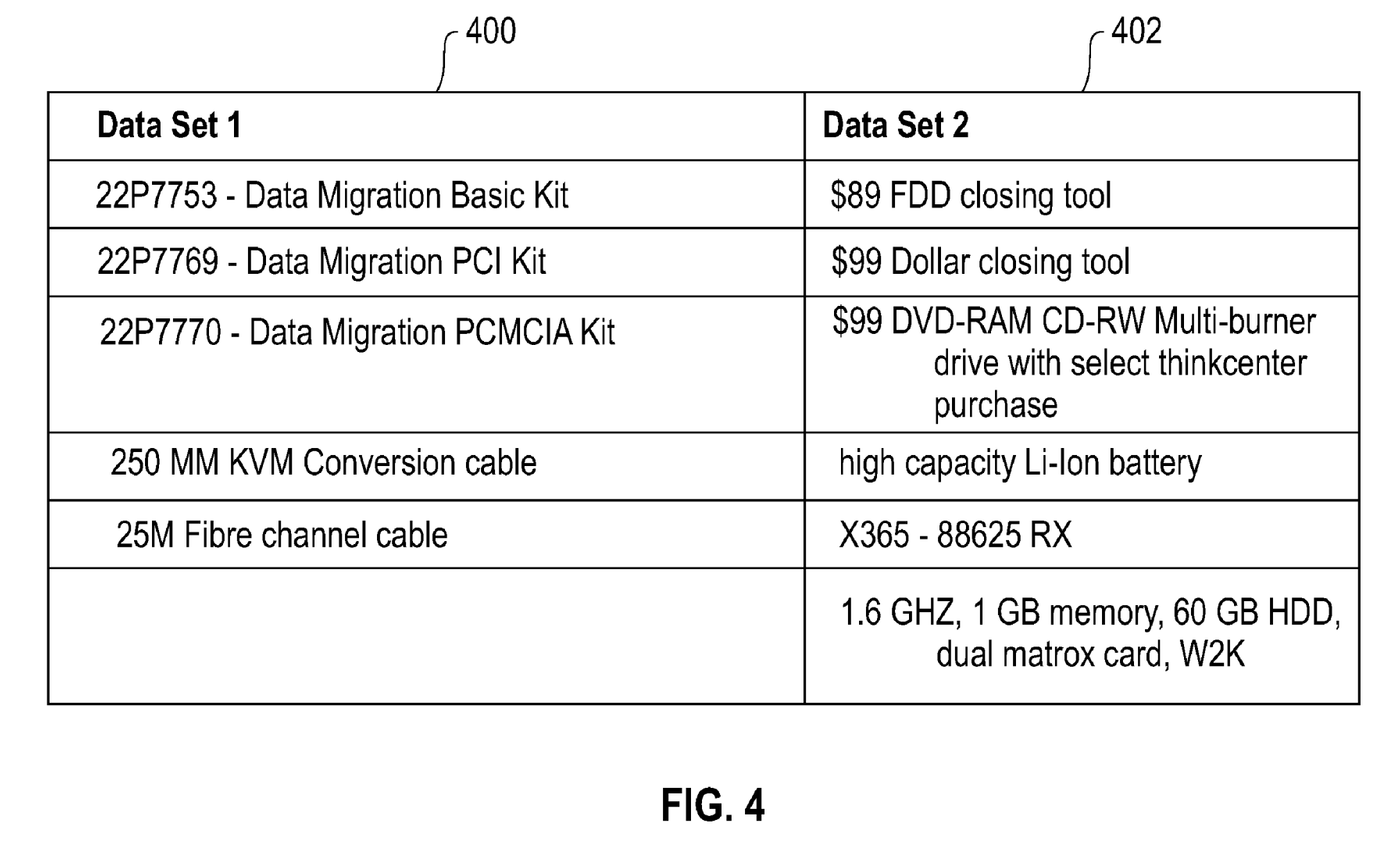
FIG. 4 is a diagram illustrating snippets of data, initially and after transformation using regular expression discovery and replacement.

FIG. 4 illustrates the results of experiments on two data sets 400, 402, for the two kinds of transformations discussed above. The embodiments herein compute the similarity across data sets based on the input data sets as given, and subsequently, based on the transformed data. The embodiments herein observe that in each case, the similarity results on the transformed data provides additional discriminating results. The embodiments herein also show some examples of the transformed data sets.

The data sets 400, 402 that the embodiments herein process are product data from the Information Technology (IT) department of an organization. FIG. 4 shows samples that can be considered to be good candidates for the transformation because of the following reasons:
(a) they are similar in context and
(b) they contain many non-dictionary words (22P7753, 22P7769, etc.) that could be replaced by one word pattern, without losing the sense of the document for the purposes of assessing text similarity.

Figure 5:
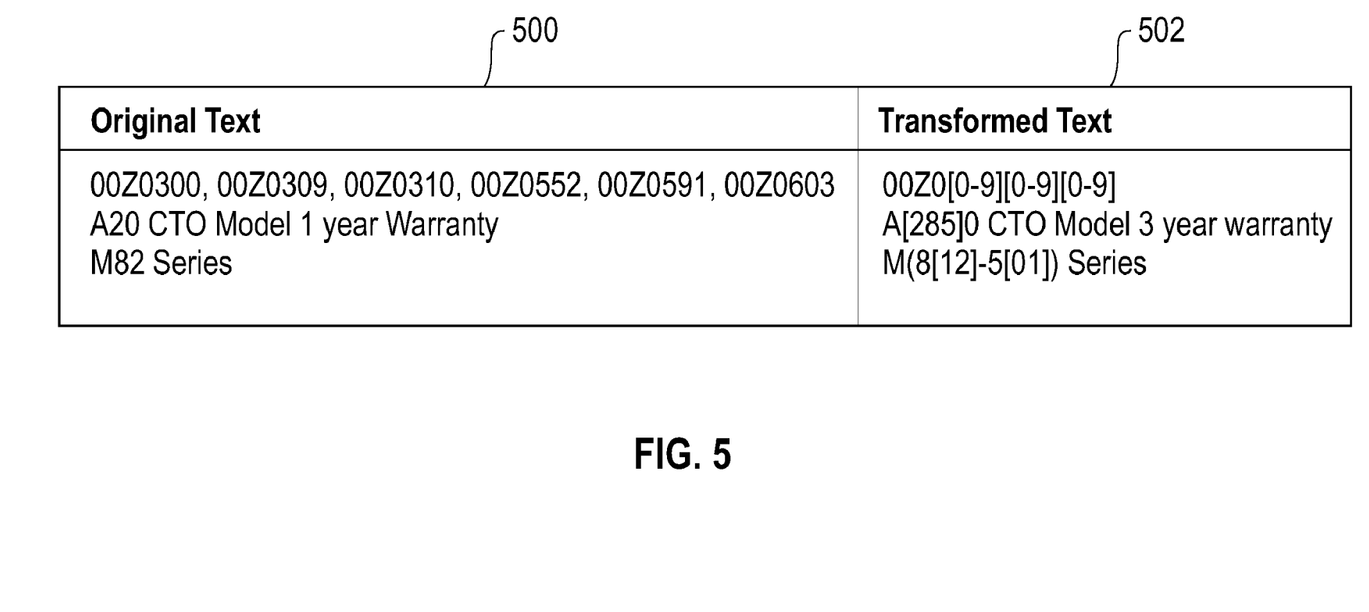
FIG. 5 is a diagram illustrating similarity results for data sets on product information, before and after pattern discovery and replacement.

FIG. 5 is a diagram illustrating snippets of data, initially 500 and after transformation 502 using regular expression (pattern) discovery and replacement. Thus, the alphanumeric strings (0020300, etc.) can be replaced with a more generic term in the transformed document 502. Further, the remaining similar terms can be replaced with generic terms in the transformed document, as shown.

Figure 6:
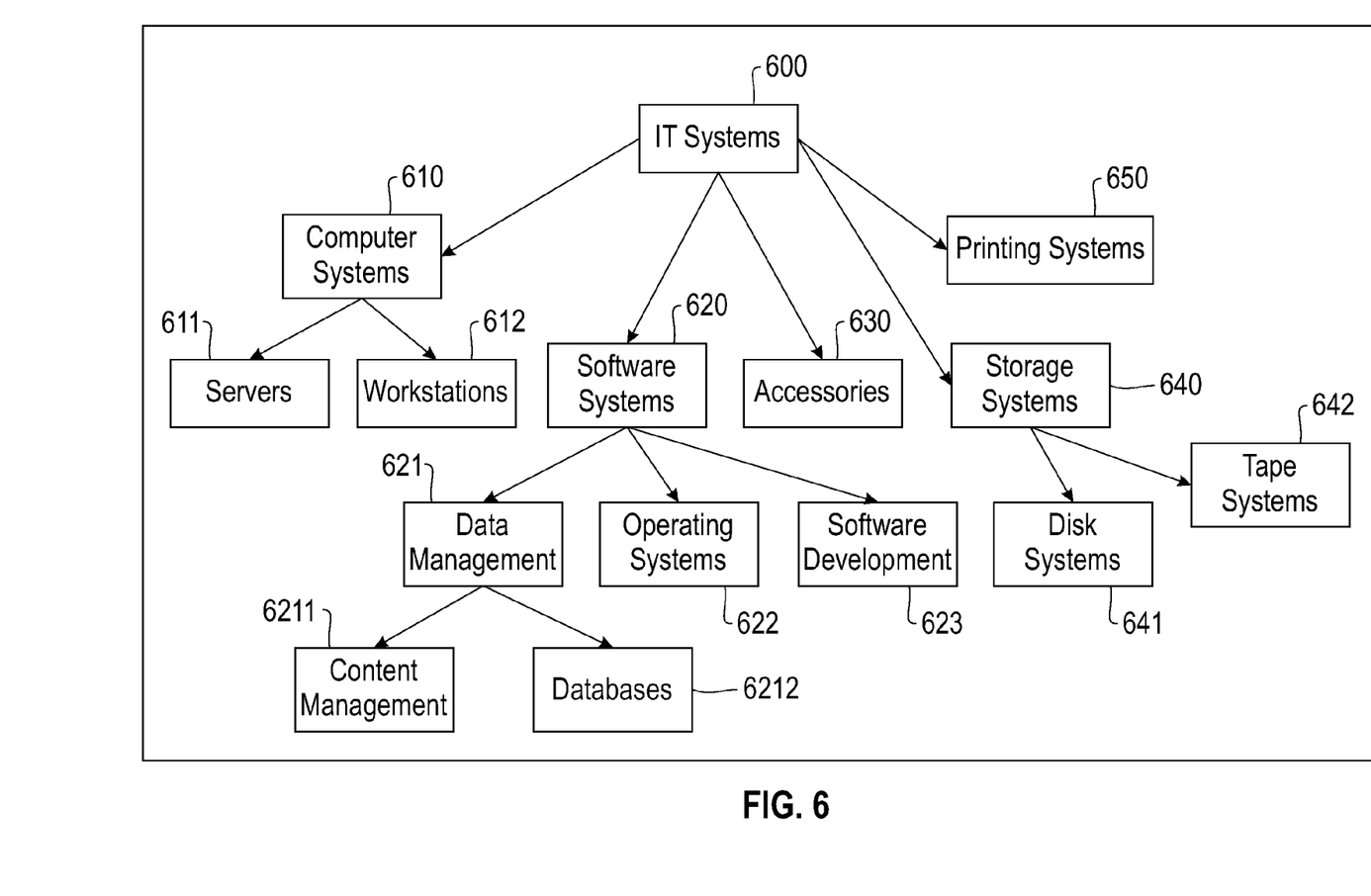
FIG. 6 is a diagram illustrating an example of a (partial) taxonomy for IT-related terms.

FIG. 6 gives an example of taxonomy for a specific domain, viz., computers and peripherals. As the embodiments herein proceed from the root of the taxonomy (IT systems 600) down through the various branches (computer systems 610, software systems 620, accessories 630, storage system 640, printing systems 650, etc.), the embodiments go from the more generic items to the more specific items. When different data sets refer to various items at the lower levels, for comparing the data sets, it is relevant to replace the various terms that refer to the more specific items by the more general terms. The same applies to the next hierarchical level (items 621-623, 641, 642) and subsequent hierarchical levels (6211, 6121). This allows for comparison across the data sets on a more normalized fashion.

Figure 7:
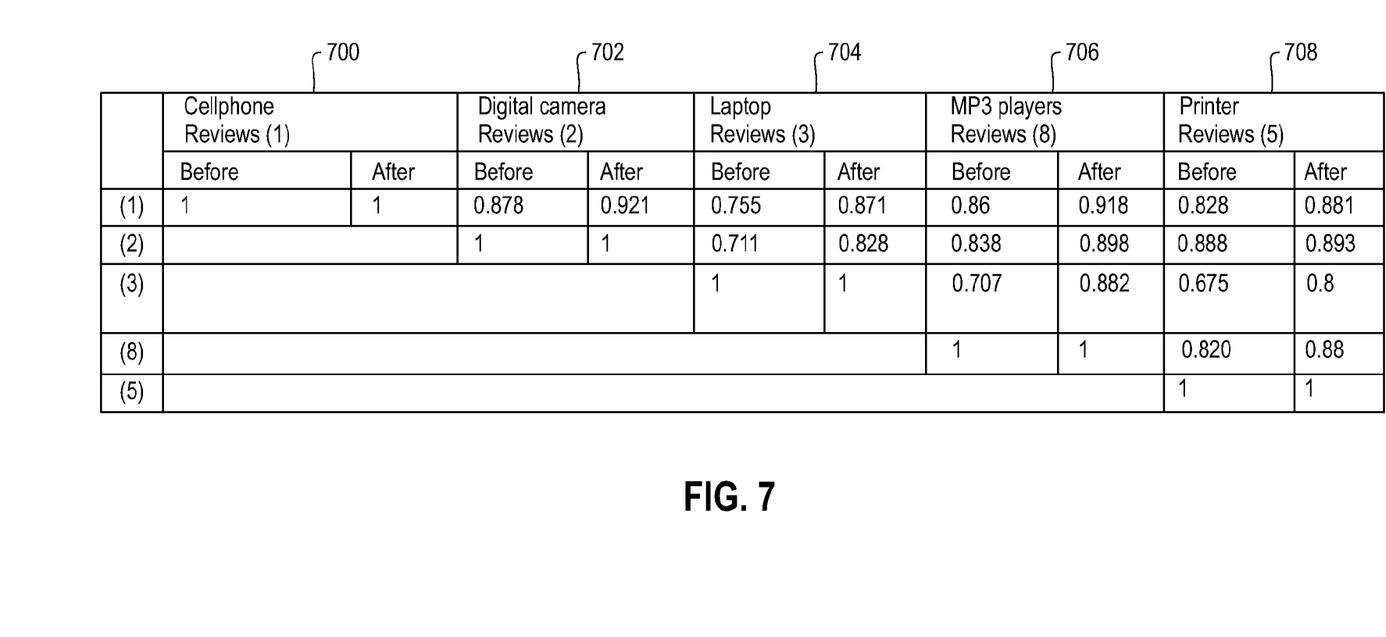
FIG. 7 is a diagram illustrating similarity results for data sets on product information, before and after term replacement based on taxonomy, for word unigram tokens.

In FIG. 7, the embodiments herein show the results of one such comparison. The data sets under consideration are product reviews of electronic/computer items and peripherals. Five data sets were considered—product reviews of laptops 704, printers 708, cell phones 700, digital cameras 702 and mp3 players 706. Similarity measures were computed across each pair of these data sets. Subsequently these data sets were parsed, and all manufacturer-specific names and terms were removed and replaced by the more generic term in the taxonomy tree. Similarity measures were computed for these transformed data sets, and in each case the measure was higher than the initial value, as shown in FIG. 7.

Hence, by using the definition of similarity based on a hierarchical semantics, the embodiments herein are able to arrive at more discriminating similarity measures. While the embodiments herein have shown two specific transformations, other kinds of transformations could also be used such as based on thesauri and dictionaries, ontologies and online taxonomies, and named-entity annotators.

Thus, the embodiments of the invention provide a process for defining similarity across text documents, which includes apart from word overlap, semantic similarity based on hierarchical levels in taxonomy, and pattern-based similarity, based on similar patterns occurring in the various documents. Moreover, a process is provided for transforming given source text to a normalized form based on discovery of commonalities across the different texts in the data set; these commonalities could be pattern-based, or based on hierarchies in a domain-related taxonomy or ontology. Furthermore, assessment of similarity measures based on the transformed data sets is provided, to yield more discerning similarity measures.

Figure 8:
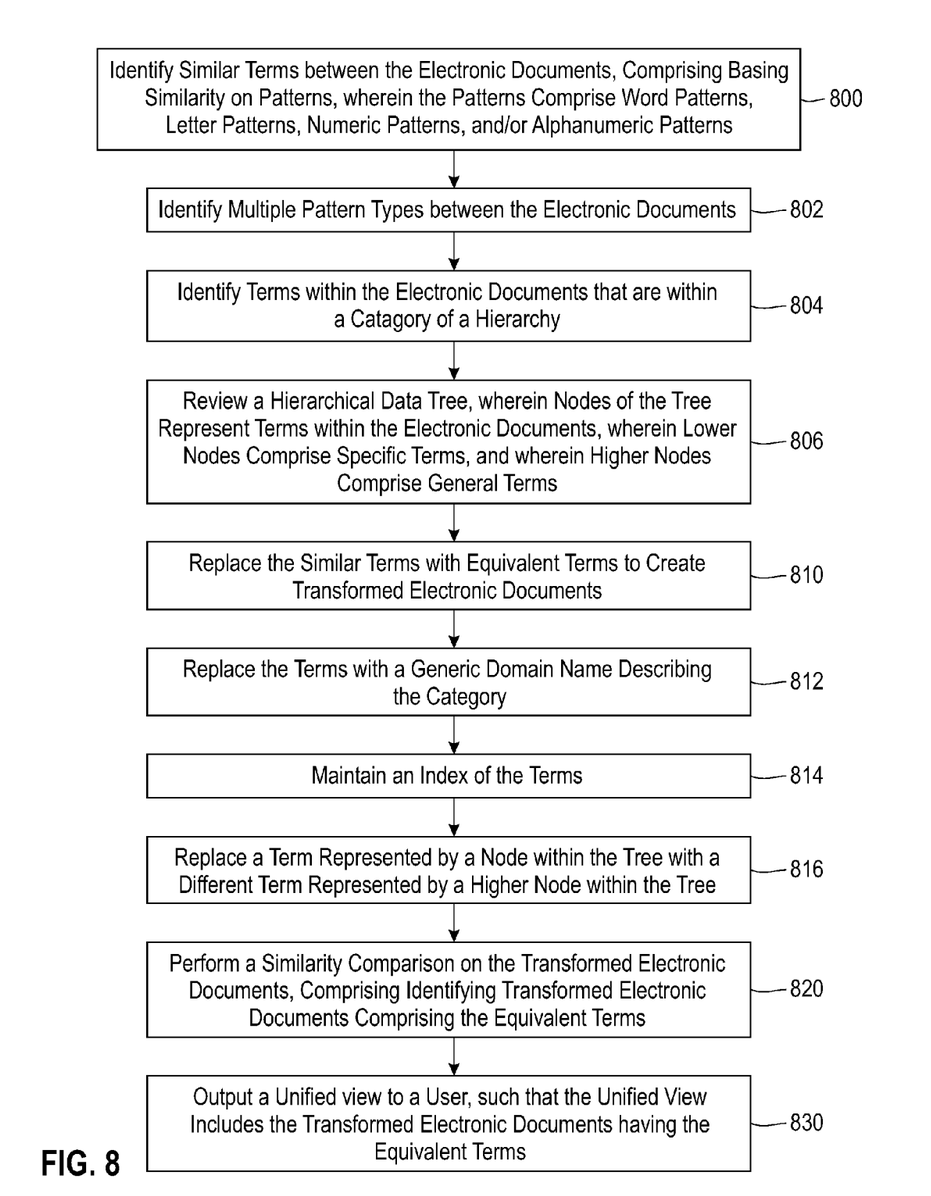
FIG. 8 is a flow diagram illustrating a method of measuring similarity between at least two electronic documents.

FIG. 8 is a flow diagram illustrating a method of measuring similarity between at least two electronic documents. The method begins by identifying similar terms between the electronic documents (item 800). This includes basing similarity between the similar terms on patterns, wherein the patterns can include word patterns, letter patterns, numeric patterns, and/or alphanumeric patterns. The identifying of the similar terms also includes identifying multiple pattern types between the electronic documents (item 802). Moreover, the basing of the similarity on patterns identifies terms within the electronic documents that are within a category of a hierarchy (item 804). Specifically, the identifying of the terms reviews a hierarchical data tree, wherein nodes of the tree represent terms within the electronic documents (item 806). Lower nodes of the tree have specific terms; and, wherein higher nodes of the tree have general terms.

Next, the method replaces the similar terms with equivalent terms to create transformed electronic documents (item 810). This can include replacing the terms with a generic domain name describing the category (item 812). The method can also include maintaining an index of the terms (item 814). The replacing of the similar terms can also include replacing a term represented by a node within the tree with a different term represented by a higher node within the tree (item 816).

Following this, a similarity comparison is performed on the transformed electronic documents (item 820). This can involve identifying (and/or constructing) transformed electronic documents having the equivalent terms. Subsequently, a unified view is output to a user (item 830). The unified view includes the transformed electronic documents having the equivalent terms.

Figure 9:
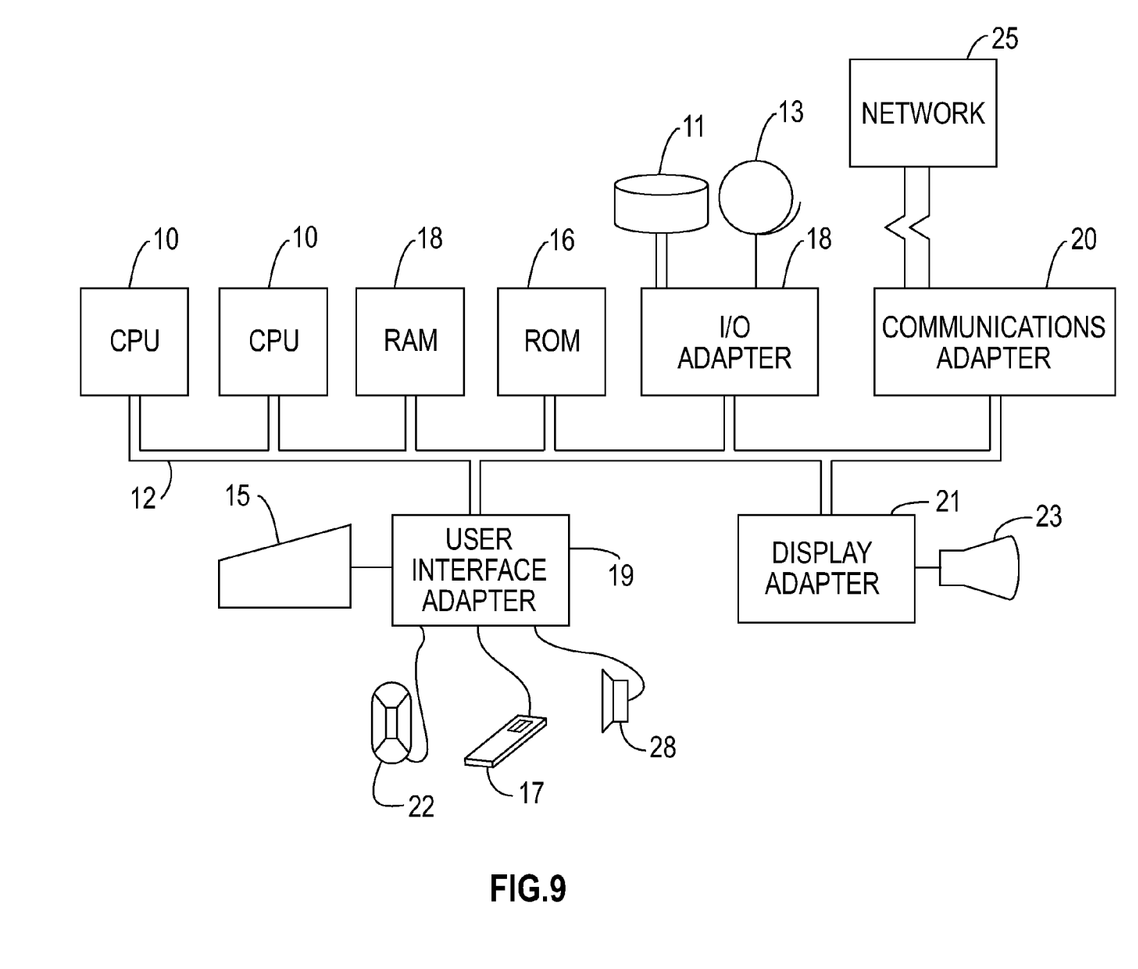
FIG. 9 is a diagram illustrating a representative hardware environment for practicing the embodiments of the invention.

A representative hardware environment for practicing the embodiments of the invention is depicted in FIG. 9. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention provide a definition of similarity across data sets, based on hierarchical levels of semantics for different words in the text. The hierarchical levels may be discovered based on some preprocessing techniques. A system is also provided for transforming the source document into a related document where the more general terms replace the specific terms across the different documents, based on the hierarchy defined previously. Further, a system is provided for improving the similarity assessment of text documents by performing the assessment on the transformed documents.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method for data integration between electronic documents, said method comprising:
    identifying, by a computer, first similar terms between said electronic documents, each of said first similar terms referring to a same kind of entity and comprising an alphanumeric string, including a first number of letter characters followed by a second number of numeric characters;
    replacing, by said computer, each of said first similar terms with a single equivalent term that replaces one or more of said second number of numeric characters with a common string pattern representation to create transformed electronic documents;
    identifying, by said computer, second similar terms between said two documents, each of said second similar terms belonging to a different level of a same hierarchical semantic data tree, wherein a lower node of said hierarchical semantic data tree represent a specific term and a higher node represents a general term;
    replacing, by said computer, said specific term of said lower node of said two documents with said general term of said higher node to create transformed electronic documents;
    performing, by said computer, a similarity comparison on said transformed electronic documents; and
    outputting, by said computer, a unified view to a user, such that said unified view comprises said transformed electronic documents.

2. The method according to claim 1, wherein said identifying of said first similar terms between said electronic documents comprises identifying multiple pattern types between said electronic documents.

3. The method according to claim 1, wherein said identifying second similar terms within said electronic documents comprises said electronic documents that are within a category of a hierarchy.

4. The method according to claim 3, wherein said replacing said specific term comprises replacing said specific term with a generic domain name describing said category.

5. The method according to claim 3, further comprising maintaining, by said computer, an index of said first and second similar terms.

6. A computer-implemented method for data integration between electronic documents, said method comprising:
    identifying, by a computer, similar terms between said electronic documents, each of said similar terms referring to a same kind of entity and comprising an alphanumeric string, including a first number of letter characters and a second number of numeric characters;
    replacing, by said computer, each of said similar terms with a single equivalent term that replaces one or more of said first number of letter characters and one or more of said second number of numeric characters with a common string pattern representation to create transformed electronic documents;
    performing, by said computer, a similarity comparison on said transformed electronic documents; and
    outputting, by said computer, a unified view to a user, such that said unified view comprises said transformed electronic documents.

7. The method according to claim 6, wherein said identifying of said similar terms between said electronic documents comprises identifying multiple pattern types between said electronic documents.

8. The method according to claim 7, further comprising maintaining, by said computer, an index of said similar terms.

9. A computer-implemented method for data integration between electronic documents, said method comprising:
- identifying, by a computer, similar terms between said electronic documents, said identifying comprising basing similarity between said similar terms on string patterns of letter or numeric characters, said basing of said similarity on string patterns comprising identifying terms within said electronic documents, wherein said string patterns comprise at least one of letter patterns, numeric patterns, and alphanumeric patterns including letter and numeric characters;
- replacing, by said computer, each of said similar terms with a single equivalent term that replaces said string patterns with a common string pattern representation to create transformed electronic documents;
- performing, by said computer, a similarity comparison on said transformed electronic documents; and
- outputting, by said computer, a unified view to a user, such that said unified view comprises said transformed electronic documents comprising said equivalent terms.

10. The method according to claim 9, wherein said identifying of said similar terms between said electronic documents comprises identifying multiple pattern types between said electronic documents.

11. The method according to claim 9, further comprising maintaining, by said computer, an index of said terms.

12. A non-transitory computer program storage device, storing computer readable instructions executable by a computer for performing a method of data integration between electronic documents, said method comprising:
- identifying first similar terms between said electronic documents, each of said first similar terms referring to a same kind of entity and comprising an alphanumeric string, including a first number of letter characters followed by a second number of numeric characters;
- replacing each of said first similar terms with a single equivalent term that replaces one or more of said second number of numeric characters with a common string pattern representation to create transformed electronic documents;
- identifying second similar terms between said two documents, each of said second similar terms belonging to a different level of a same hierarchical semantic data tree, wherein a lower node of said hierarchical semantic data tree represent a specific term and a higher node represents a general term;
- replacing said specific term of said lower node of said two documents with said general term of said higher node to create transformed electronic documents;
- performing a similarity comparison on said transformed electronic documents; and
- outputting a unified view to a user, such that said unified view comprises said transformed electronic documents.

* * * * *